United States Patent [19]

Suzuki

[11] Patent Number: 5,357,620
[45] Date of Patent: Oct. 18, 1994

[54] BIT ADDRESSING SYSTEM
[75] Inventor: Hiroaki Suzuki, Tokyo, Japan
[73] Assignee: NEC Corporation, Tokyo, Japan
[21] Appl. No.: 115,125
[22] Filed: Sep. 1, 1993

Related U.S. Application Data

[63] Continuation of Ser. No. 477,384, Feb. 9, 1990, abandoned.

[30] Foreign Application Priority Data

Feb. 9, 1989 [JP] Japan ................................. 1-31447

[51] Int. Cl.$^5$ ........................ G06F 12/00; G06F 12/04
[52] U.S. Cl. ..................................... 395/400; 395/166;
364/255.1; 364/259.5; 364/DIG. 1
[58] Field of Search ...................... 395/400, 425, 166

[56] References Cited

U.S. PATENT DOCUMENTS

| 4,103,329 | 7/1978 | Davis et al. ............... 395/400 X |
| 4,520,439 | 5/1985 | Liepa ........................ 395/425 |
| 4,538,223 | 8/1985 | Vahlstrom et al. ............ 395/400 |
| 4,941,085 | 7/1990 | Sakamura et al. ............. 395/375 |
| 4,977,497 | 12/1990 | Sakamura et al. ............. 395/375 |
| 5,034,900 | 7/1991 | Kimura et al. ............... 395/166 |

FOREIGN PATENT DOCUMENTS 2099163 2/1972 France .

OTHER PUBLICATIONS

I. Cramer, "The Z8000 family provides advanced system solutions", IEEE Electro, vol. 8, Suppl., 1983, pp. 2/1/1–2/1/9.

Primary Examiner—Joseph L. Dixon
Assistant Examiner—Michael A. Whitfield
Attorney, Agent, or Firm—Sughrue, Mion, Zinn, Macpeak & Seas

[57] ABSTRACT

A bit addressing system is disclosed in which on N-bit long addressing for the main storage is executed by means of a computation including a plurality of fields in an addressing operand. When there exist predetermined fields in the addressing operand, the value determined by the fields is regarded as the value for the bit unit in the two's complement representation, and a base address and a bit offset are generated by adding the value obtained by shifting the bit unit value by M bits in the direction of the lower order bits, to the address of the byte unit. Namely, it becomes possible to designate two effective addresses of a base address which is a byte address and a bit offset which is the bit displacement from the base address by means of a single operand. The range of designation of the bit offset is from $-2^{N-1}$ bit to $(+2^{N-1}-1)$ bit, and it is possible to designate the range of $2^{N+M}$ bits as bit addresses.

6 Claims, 4 Drawing Sheets

BIT ADDRESSING SYSTEM

This is a continuation of application Ser. No. 07/477,384 filed Feb. 9, 1990 now abandoned.

BACKGROUND OF THE INVENTION

1. Field of the Invention

The present invention relates to an addressing system for an information processing apparatus or a microprocessor and, more particularly, to a bit addressing system which executes accessing in a bit unit.

2. Description of the Prior Art

In the processing of a data by means of a computer, it is general to make a prearrangement as to where the data is to be stored in what form. The method which indicates where the data is located is termed an addressing method while the prearrangement which tells in what form it exists is termed a data type. A data is addressed and the contents of the data are interpreted, processed, and transferred in accordance with instructions described in confirmity with such a prearrangement.

The minimum addressing unit for a memory is normally one byte (8 bits). That is, a memory is defined as a simple string of bytes, and the data is accessed through its byte address. A byte address is a value which uniquely specifies the position of the byte.

An instruction format consists generally of an array of an instruction code which shows an operation, and in addressing operand which specifies the operation data that become the objects of the instructed operation. The addressing operand includes a plurality of field to provide various addressing modes in accordance with the combination thereof. However, in the respectige addressing modes, the minimum addressing unit for a memory is still one byte.

On the other hand, there is an instruction requiring a bit addressing among instructions to be executed. A typical example is a bit field instruction. This instruction is used to perform an operation such as extraction, insertion, comparison or the like on data defined by a string of bits, i.e. a bit field, having an arbitrary length and a leading bit of an aribitary address (not only byte boundary address). Therefore, the bit address is required in order to execute the bit field instruction. However, since the minimum addressing unit specified by the addressing operand is the byte address as described above, the addressing operand of the bit field instruction also specifies the address of a memory in byte unit. For this reason, another operand called "bit offset operand" is required to represent offset information of the leading bit in the bit field to be processed from the byte address of the byte data containing the leading bit.

As in the above, the prior art addressing system makes use of two operands (namely, the base address operand and the bit offset operand) for showing the bit position, so that it becomes a double-addressing mode which takes time for address computation. Moreover, its encoder efficiency is low.

BRIEF SUMMARY OF THE INVENTION

Object of the Invention

Accordingly, it is a main object of the present invention to provide a bit addressing system which enables address calculation is short time.

SUMMARY OF THE INVENTION

In the bit addressing system according to the present invention, address information for the bit addressing is derived only from the contents of an addressing operand. Namely, when such an instruction is decoded that requires a bit addressing and has an addressing operand including first and second fields, the value determined by the first field is regarded as the bit unit value in the two's complement representation, and an effective byte address and a bit offset are generated by adding the value obtained by shifting the above-mentioned bit unit value by M bits in the direction of the lower order bits, to the address determined by the second field.

Consequently, it is possible to designate two effective addresses, namely, a byte address which contains a target bit and a bit offset which represents bit displacement of this target bit from the base address, using a single operand. The designation range of the bit offset is from $-2^{N-1}$ bit to $(+2^{N-1})$ bit, being able to designate the range of $2^{N+M}$ bits as the bit addresses.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Before proceeding to the description of an embodiment of the present invention a brief description of the prior art addressing system will be in order.

Figure 1:
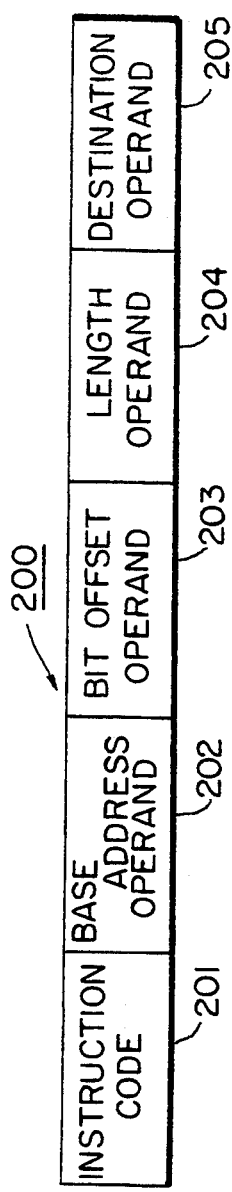
FIG. 1 shows the format of a bit field instruction in accordance with the prior art addressing system.

FIG. 1 shows the format of a bit field instruction that handles a variable length data in terms of an example of bit string extraction. The bit field is an integer/natural number data type with variable bit length that can take on an arbitrary (zero to 32 bit) bit length. This is a data type which is effective when a compact representation is required in a large amount of arrayed data or structural bodies. In a bit field representing an integer, binary representation in terms of two's complement is adopted, while in a bit field representing a natural number, a non-negative integer is directly represented by the binary representation. In either case, the scaling takes the "bit-number zero" as the least significant bit (LSB), and the scaling becomes higher as the bit-number is increased. The bit field instruction is an instruction which causes a bit field at an arbitrary position (not only the byte boundary position) in the memory to go through extraction, insertion, comparison or the like. The bit field instruction shown in FIG. 1A is an instruction which causes an extraction of a bit string, and causes to store the extracted bit string in a storage destination designated by the destination operand.

The bit string extraction instruction 200 shown in FIG. 1 includes an instruction code 201 which indicates the extraction of the bit string, a base address operand 202 which shows the base address which becomes the reference for the byte unit, a bit offset operand 203 which shows the bit offset from the effective byte address, a length operand 204 which shows the bit length of the data, and a destination operand 205 which shows the storage destination for storing the extracted data.

Figure 2:
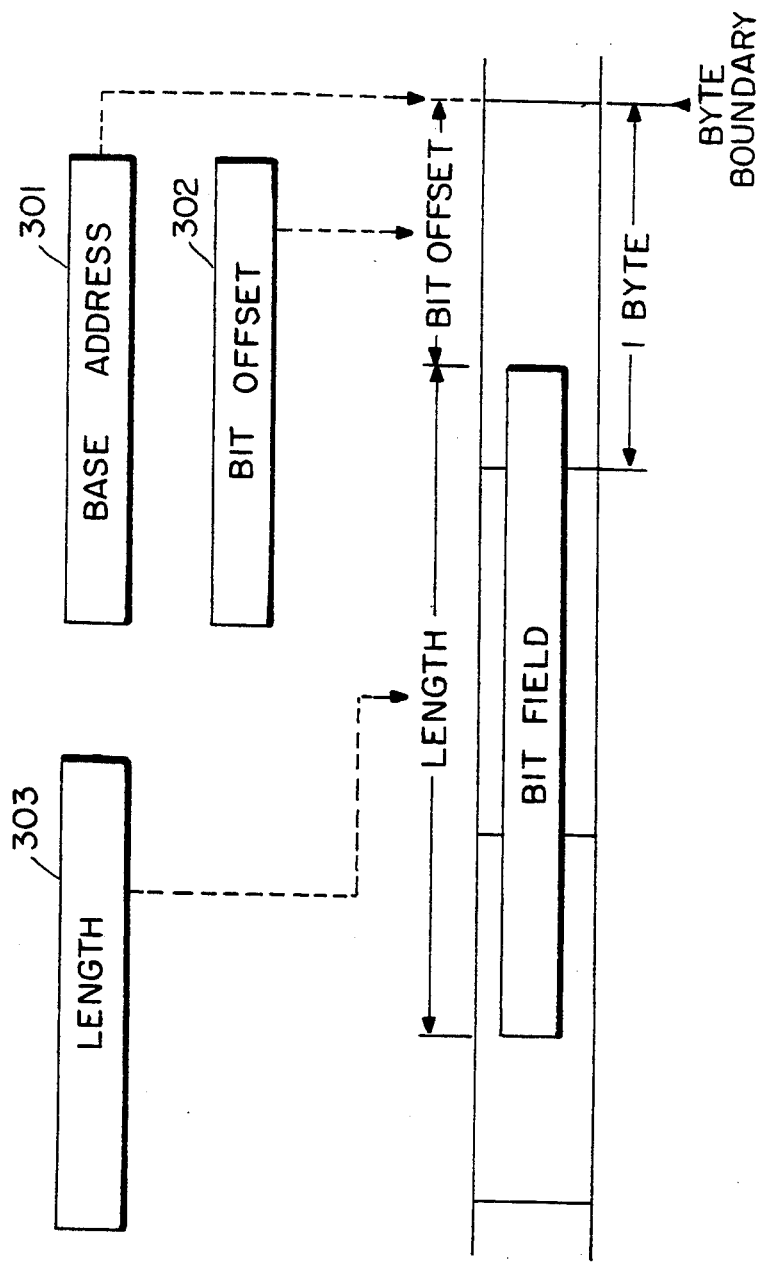
FIG. 2 shows the method for obtaining an effective address from the operands in the bit field instruction shown in FIG. 1 in accordance with the prior art addressing system.

Referring to FIG. 2, addressing operation on a hardware will be described next. The instruction code 201 of the instruction 200 fetched from the memory is interpreted by an instruction decoder. The base address operand 202 in the instruction 200 is sent to an effective address generator (not shown). In the effective address generator, the operand field in the base address operand 200 is detected, and an effective address 301 (address of the byte boundary) of the base address is generated. The memory is accessed by the effective address 301 generated, and the data is loaded.

The bit offset operand 203, too, is sent to the effective address generator, and an effective address 302 of the bit offset is generated. The effective address 302 shows the distance from the head of the data loaded by the effective address 301 to the target data. In addition, the value designated by the length operand 204 represents the data length 303.

According to the prior art addressing system, addressing is executed in a two-addressing mode that makes use of the two operands that show the bit position (base address operand 202 and bit offset operand 203), so that it takes time for address computations. Namely, first, the effective address 301 is generated by the base address operand 202. Then, the effective address 302 is generated by the bit offset operand 203. Accordingly, the processing by the bit offset operand 203 cannot be started until the processing by the base address operand 202 is completed, which makes the overall time of address computation large.

Further, in the case where the addressing modes can individually be designated for separate operands, when the base address and the bit offset can be designated by the respectively separate operands, the bit offset can freely select the addressing mode. However, from the uses and the characteristics of the addressing modes that are practically available are limited to only several types, meaning that these functions are largely redundant.

Moreover, when the bit offset in allowed to take on a value larger than the width of the data bus or a negative value, the target data does not exist in the loaded data and it amounts to have accessed an invalid data. Therefore, the value of the bit offset has to be limited to a range between zero and a value that is determined by the data bus width.

Figure 3A:
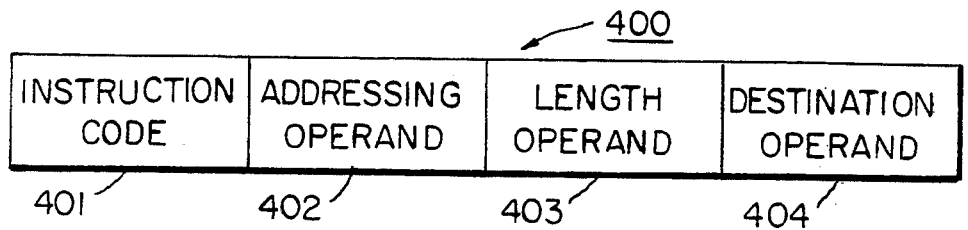
FIG. 3 shows the format of a bit field instruction in an embodiment of the present invention and FIG. 3B is a format of an addressing operand shown in FIG. 3A.
Figure 3B:
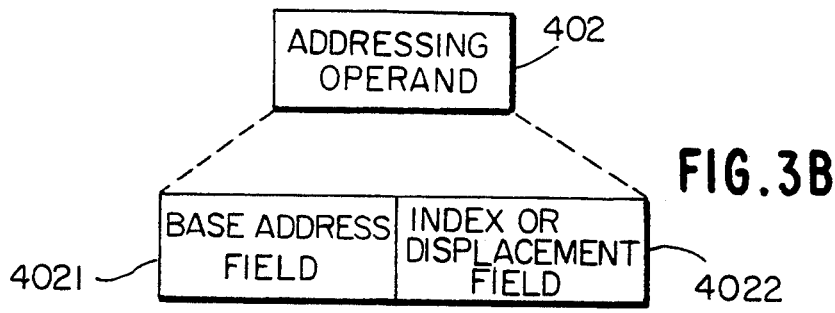
Figure 4:
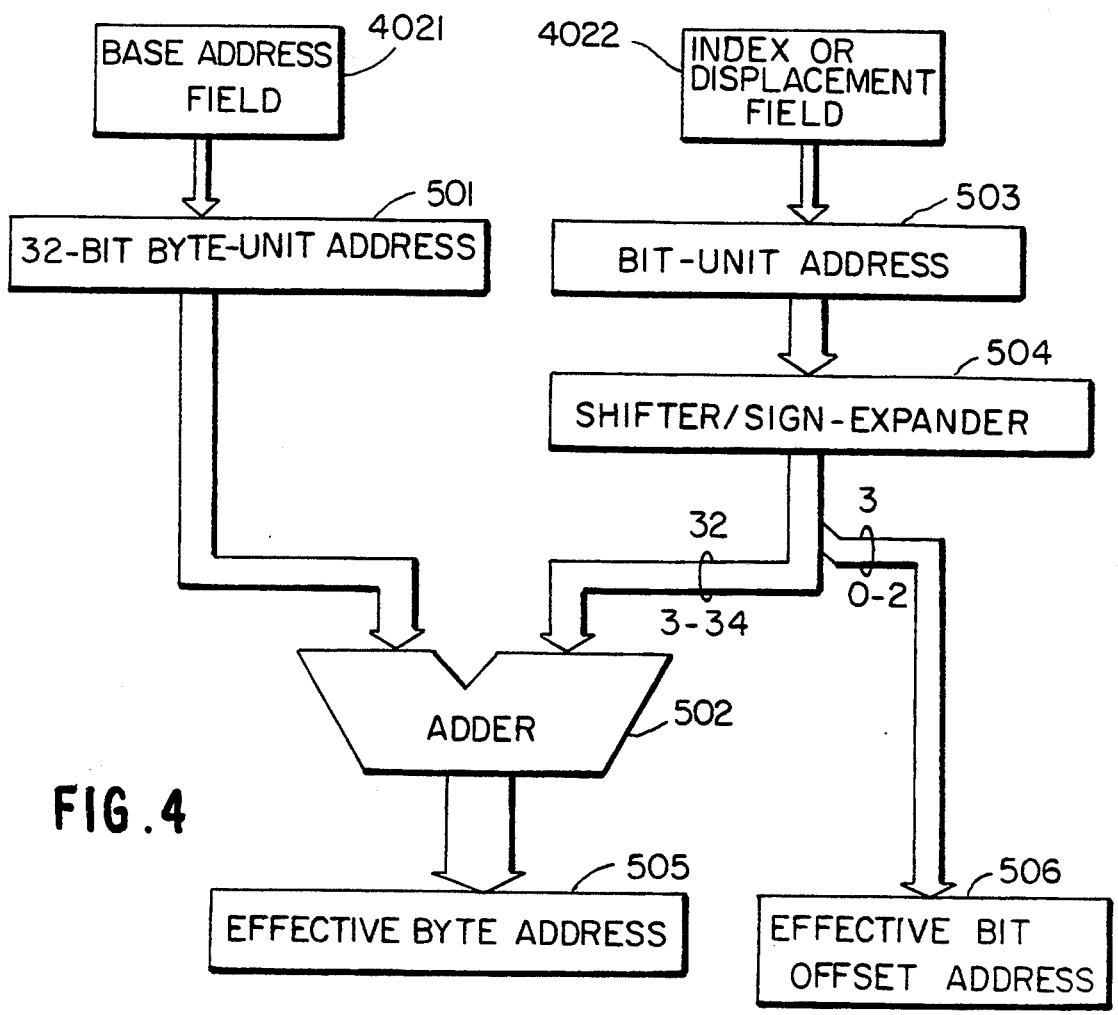
FIG. 4 shows the method for obtaining an effective address from the bit address instruction shown in FIG. 3.

Referring to FIG. 3A, the bit field instruction 400 employed by an employment of the present invention includes an instruction code 401, an addressing operand 402 which includes a base address field 4021 and an index or displacement field 4022 as shown in FIG. 3B, a length operand 403 which shows the length of the bit string, and a destination operand 404 which shows the destination where the extracted data is stored.

In the present embodiment, when the contents of the instruction code 401 indicated that an instruction including this code requires bit addressing, the value determined by the field 4022 of the addressing operand 402 is regarded treated as data representing the distance or bit number between the byte address determined by the base address field 4021 and the leading bit of the bit field to be processed. On the other hand, when the Contents of the instruction code 401 does not indicate the requirement of bit addressing, the value determined by the field 4022 is regarded as a conventional byte addressing data.

When the bit field instruction 400 is fetched, the instruction code 401 thereof is supplied to a decoder (not shown) and decoded therein. On the other hand, the addressing operand 402 is supplied to an effective address generator shown in FIG. 2. A 32-bit byte-unit address 501 is derived from the base address field 4021 of the addressing operand 402 and then supplied to the leftside input of an adder 502. On the other hand, an address derived from the field 4022 of the operand 402 is used as a bit-unit address 503 and then supplied to a shifter/sign-expander 504. This shifter/sign-expander 504 shifts the bit-unit address 503 by 3 bits in the direction of the lower order bits and further adds data, which is the same as the data of the most significant bit (i.e., the sign bit) of the address 503, to the shifted data as the most significant three bits. 35-bit address data in thus derived. The more significant 32 bits (bit-number 34 to 3) are then supplied to a rightside input of the adder 502. The adder 502 adds the data on two inputs thereof and then produces a 32-bit address 505. Accordingly, this address 505 represents an effective byte address of a byte data containing the leading bit of the bit field to be processed. The remaining three bits (bit-number 2 to 0) from the shifter/sign-expander 504 represents an effective offset address of that leading bit from the effective byte address 505. Thus, the effective byte address 505 and bit offset address 506 are derived substantially simultaneously from one addressing operand 402. The bit addressing is thereby enabled.

Figure 5:
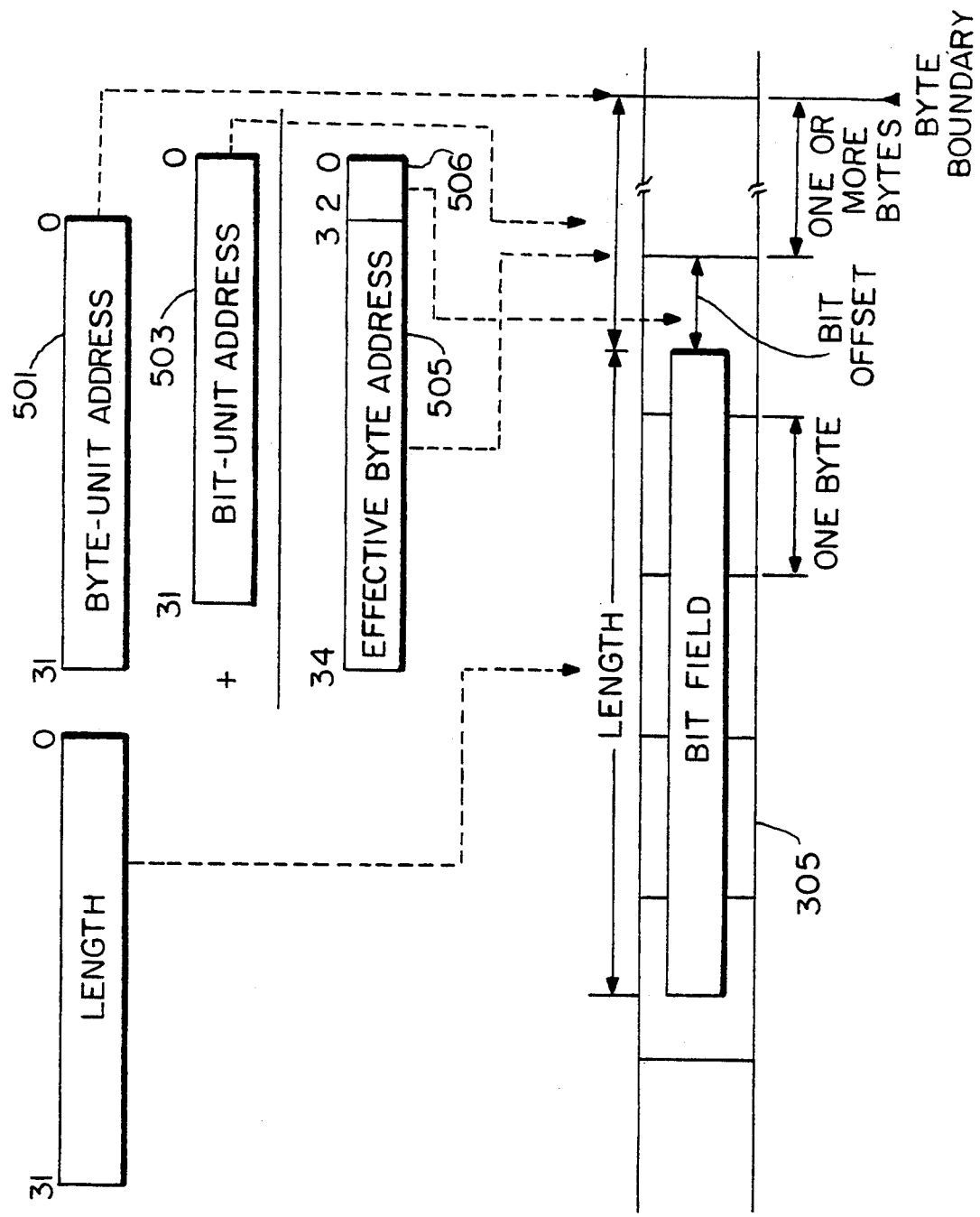
FIG. 5 shows the relation between the effective address obtained and the data on the memory.

Referring to FIG. 5, there is shown a relationship between a memory map and the respective addresses. Specifically, the byte-unit address 501 represents a byte address of a predetermined byte on a memory 305 and the bit-unit address 503 represents the distance between (i.e., the number of bits) this byte address and the leading bit of the bit field to be processed. Therefore, the address 505 from the adder 502 represents the effective byte address of a byte containing that leading bit, and the address 506 represents a bit offset of the leading bit from the byte address 505.

Figure 6:
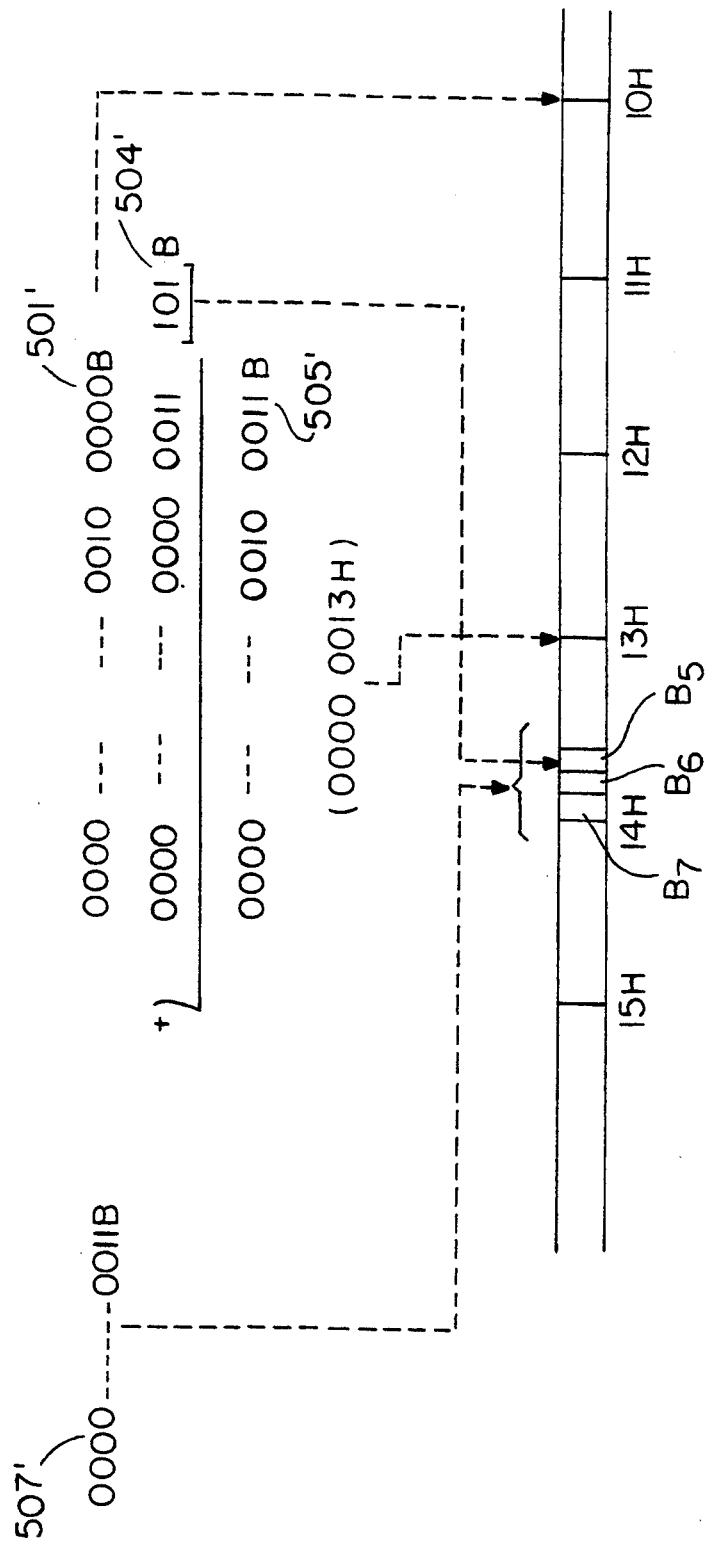
FIG. 6 shows the detailed example for obtaining a bit address in accordance with the present invention.

As a detailed example, such a bit field extraction instruction will be considered that commands to extract three bits data of bit-numbers 5 to 7 of byte-address "0000 0013H" and then to transfer a general purpose register R0. In this example, byte-address "0000 0010H", which is previously stored in another general purpose register R1, is utilized as a base address determined by the base address field 4021 of the addressing operand 402. Therefore, the field 4021 is a base address register designation field and thus written with code "00001B" for designating the register R1. If desired, immediate data can be written into the field 4021. Since the field 4022 is used as a displacement field, it is written with the distance between the base address and the leading bit of the bit field to be processed, "0000 001DH". If the field 4022 is used as an index field, it is written with a code for designating an index register storing data representive of that distance. The content of the length operand 403 takes a value of "0000 0003H" in the immediate data form. The register designation mode (or form) can be employed, if desired. The destination operand 404 is written with code "00000B" for designating the register R0. When the bit field extraction instruction including the above codes and information is executed, the address information 501' shown in FIG. 6 is read out from the register R1 by the base address register designation field 4021 and then supplied to the adder 502. On the other hand, the content of the displacement field 4022 are supplied to the shifter/sign-expander 504, so that the output 504' shown in FIG. 6 is derived. The more significant 32-bit data thereof is supplied to the adder 502 and added to the address 501'. Added resultant 505' shown in FIG. 6, namely an effective byte-address "0000 0013H", is thereby produced to specify a byte containing the leading bit of the bit field to be processed. The remaining less significant three-bit data, "101B", represents the bit offset address for designating the bit-number 5. The length information 507' is "3H". Thus, the data of the bit-numbers 5 to 7 of the byte-address "0000 0013H" are extracted and then transferred to the register Since the value derived from the field 4022 is treated as data of a 2's complement form, it is possible to access a particular bit of a byte having an address smaller than the base byte address. For instance, assuming that the base byte address is "0000 0010H" and the particular bit is a bit-number 4 of byte-address "0000 000EH", the value derived from the field 4022 is designed to be "FFFF FFF4H". As a result, the output 505 of the adder 502 takes a value of "0000 000EH" and the less significant three-bit takes a value of "100B".

Both of the index field and displacement field may be containted in the field 4022, and in that case, the added resultant value of both fields is set to be distance between the base byte address and the target bit. In case where two displacement fields are containted in the field 4022, the data of a memory byte designated by the contents from the base address field 4021 and the first displacement field is used as a true base byte address, and the distance between that true base byte address and the target bit is defined by the second displacement field.

When an instruction to be executed does not require bit addressing, both of the fields 4021 and 4022 are used as a conventional byte-unit address information to provide the following addressing modes:

(1) Register Indirect with Index Mode:

This is an addressing mode for designating a data in the effective address computed from the two of the base address value and the index value (or the bit offset value) from the base address.

(2) Register Indirect Displacement Mode:

This is an addressing mode for designating a data in the effective address computed from the two values of the base address and the displacement (or the bit offset) of the base address.

(3) Register Indirect Displacement with Index Mode:

This is an addressing mode for designating a data in effective address computed from the three values of the base address, the displacement from the base address, and lo the index (or the bit offset) from the base address.

(4) PC Relative Displacement Mode:

The sole difference of the present mode from the displacement mode resides in that the base address is the head address of the instruction that is currently under execution.

(5) PC Relative Displacement with Index Mode:

The sole difference of the present mode from the register indirect displacement with index mode resides in that the base address is the address of the instruction currently under execution.

(6) Register Indirect Deferred Displacement Mode:

The effective address for the present mode is computed from the two values of the base address in the register and the displacement from the base address, analogous to the register indirect displacement mode, with a difference that what is pointed by the computed address is the pointer in the memory. Namely, this is an addressing mode to be used when the pointer to the data exists in the memory (memory indirect).

(7) Register Indirect Deferred Displacement with Index Mode:

The effective address of the base pointer to the data for the present mode is computed from the two values of the base address in the register and the displacement from the base address. Namely, this is an addressing mode that is to be used when the base pointer to the data exists in the memory (memory indirect) and the effective address of the data is obtained by adding the index value (or the bit offset value) to the base pointer.

(8) PC Relative Deferred Displacement Mode:

The sole difference of the present mode from the register indirect deferred displacement mode resides in that the base address is the head address of the instruction currently under execution.

(9) PC Relative Deferred Displacement with Index Mode:

The sole difference of the present mode from the register indirect deferred displacement with index mode resides in that the base address is the head address of the instruction currently under execution.

(10) Register Indirect Double Displacement Mode:

This is a memory indirect mode which can designate two displacements (or the displacement and the bit offset), and is designated by the three elements of a base register, a displacement #2, and a displacement #1 (or the bit offset). In this mode, the data at the address computed from the base address in the base register and the displacement #2 is regarded as a new base address, and a data in the effective address computed from the new base address just mentioned and the displacement #1 (or the bit offset) is designated. This address mode is especially effective in handling a complex data structure such as a queue structure and a tree structure.

(11) PC Relative Double Displacement Mode:

The sole difference of the present mode from the register indirect double displacement mode resides in that the base address is the head adress of the instruction currently under execution. This addressing mode is also especially effective in handling a complex data structure such as a queue structure an a tree structure.

(12) Direct Address with Index Mode:

This is an addressing mode for designating a data in the effective address computed from the two values of the 32-bit base address in the direct instruction and the index value (or the bit offset) from the base address.

(13) Direct Address Deferred with Index Mode:

This is an addressing mode which has the 32-bit base address of the base pointer in the direct instruction, that is, the base pointer to the data exists in the memory (memory indirect), and is used in the case when the sum of the base pointer and the index value (or the bit offset) becomes the effective address of the data.

In the present embodiment, the addressing designation field of the operand is set the same for the bit addressing and for the conventional byte addressing, discriminating between the two by means of the contents of the instruction code. Accordingly, the increase in the number of hardwares for the instruction decoder can be suppressed since it is unnecessary to increase the types of the addressing modes.

Moreover, the bit offset value can also be designated irrespective of the width of the data bus, so that is becomes possible to enhance the degree of freedom of the program design.

In accordance with the present invention, a data which is not on the byte boundary can be designated by means of one operand so that the encoding time can be reduced and the effective address can be generated quickly. Consequently, it becomes possible to enhance the execution speed of programs that make a frequent use of data with variable length (programs for graphics that use bit maps, for example).

Further, it becomes possible to reduce the program size since the unwanted addressing mode designating mechanism can be eliminated by simplifying the designation method of the bit offset.

Although the invention has been described with referenct to a specific embodiment, this description is not meant to be construed in a limiting sense. Various modifications of the disclosed embodiment, will become apparent to persons skilled in the art upon reference to the description of the invention. It is therefore contemplated that the appended claims will cover any modifications or embodiments as fall within the true scope of the invention.

What is claimed is:

1. A bit address system for producing an effective base address and an effective bit offset address in response to an instruction including an addressing operand, said addressing operand including first and second fields, said bit addressing system comprising means responsive to a content of said first field for obtaining bit-unit address information of N bits, N being an integer more than one, said bit-unit address information being represented in two's complement form and having a sign bit as a most significant bit thereof, means responsive to a content of said second field for obtaining base address information, a shifter/sign-expander for shifting said bit-unit address information by M bits in a direction of less significant bits and expanding said sign bit by said M bits in a direction of more significant bits to generate shifted/sign-expanded address information, M being an integer and smaller than N, said shifter/sign-expanded address information being thereby constituted of most significant N bits and least significant M bits, said most significant N bits of said shifted/sign-expanded address information including (M+1) bits each having a content identical to said sign bit, and an adder adding said base address information with said most significant N bits of said shifted/sign-expanded information to produce said effective base address, said least significant M bits of said shifted/sign-expanded address information being derived as said effective bit offset address.

2. A bit addressing system as claimed in claim 1, wherein said first field is an index field.

3. A bit addressing system as claimed in claim 1, wherein said first field is a displacement field.

4. A bit addressing system as claimed in claim 1, wherein said means for producing bit-unit address information produces said bit-unit address information when said instruction is a bit field instruction.

5. A bit addressing system as claimed in claim 1, wherein a range of a bit offset caused by said bit-unit address information is $-2^{N-1}$ bit to $(+2^{N-1}-1)$ bit relative to said base address information.

6. A bit addressing system as claimed in claim 1, wherein a bit address represented by said effective base address and said effective bit offset address is designated in the range of $2^{N+M}$ bits.

* * * * *

UNITED STATES PATENT AND TRADEMARK OFFICE
CERTIFICATE OF CORRECTION

PATENT NO. : 5,357,620

DATED : October 18, 1994

INVENTOR(S) : SUZUKI

It is certified that error appears in the above-identified patent and that said Letters Patent is hereby corrected as shown below:

Col. 5, line 25, after "register" and insert --R0--.

Col. 5, line 65, delete "lo".

Signed and Sealed this

Seventh Day of March, 1995

Attest:

BRUCE LEHMAN

Attesting Officer

Commissioner of Patents and Trademarks